United States Patent
Johansen (10) Patent No.: US 6,713,099 B2
(45) Date of Patent: Mar. 30, 2004

(54) MASA BASED FOOD PRODUCTS MODIFIED WITH AN ENZYME OR A REDUCING AGENT

(76) Inventor: Lisbeth Høj Johansen, Skolegade 17, DK-8300 Odder (DK)

(*) Notice: Subject to any disclaimer, the term of this patent is extended or adjusted under 35 U.S.C. 154(b) by 0 days.

(21) Appl. No.: 09/921,492

(22) Filed: Aug. 3, 2001

(65) Prior Publication Data

US 2002/0182286 A1 Dec. 5, 2002

Related U.S. Application Data (63) Continuation-in-part of application No. PCT/IB00/00168, filed on Feb. 4, 2000.

(30) Foreign Application Priority Data

Feb. 4, 1999 (GB) ............................................. 9902520

(51) Int. Cl.[7] ............................ A21D 2/06; A21D 2/08; A23B 9/28
(52) U.S. Cl. ........................... 426/18; 426/52; 426/622; 426/626; 426/627
(58) Field of Search .......................... 426/18, 560, 622, 426/52, 549, 555, 626, 627, 618, 653

(56) References Cited

U.S. PATENT DOCUMENTS

| | | |
|---|---|---|
| 3,655,385 A | 4/1972 | Rubio |
| 4,180,591 A | 12/1979 | Kazuo et al. |
| 5,510,126 A | 4/1996 | Van Eijk et al. |
| 5,652,010 A | 7/1997 | Gimmler et al. |
| 5,792,506 A | 8/1998 | Buchanan et al. |
| 5,958,491 A | 9/1999 | Knueven |

FOREIGN PATENT DOCUMENTS

| | | |
|---|---|---|
| EP | 0 298 419 | 1/1989 |
| GB | 510367 | 8/1939 |
| GB | 1 404 899 | 9/1975 |
| WO | WO 95/14397 | 6/1995 |
| WO | WO 96/39859 | 12/1996 |
| WO | WO 96/39865 | 12/1996 |
| WO | WO 98/18343 | 5/1998 |

OTHER PUBLICATIONS

Yau, JC et al., "Effects of Food Additives on Storage Stability of Corn Tortillas." Cereal Foods World May 1994, 39(5)396–402.

*Primary Examiner*—Keith Hendricks
(74) *Attorney, Agent, or Firm*—Frommer Lawrence & Haug; Thomas J. Kowalski (57) ABSTRACT

The invention provides a masa foodstuff, methods of making and uses thereof.

11 Claims, 1 Drawing Sheet

FIGURE 1

MASA BASED FOOD PRODUCTS MODIFIED WITH AN ENZYME OR A REDUCING AGENT

This application is a Continuation-in-Part of PCT/IB00/00168, filed Feb. 4, 2000, designating the U.S., published Aug. 10, 2000 as WO 00/45647 and claiming priority from GB 9902520.7 filed Feb. 4, 1999. All of the above-mentioned applications, as well as all documents cited herein and documents referenced or cited in documents cited herein, are hereby incorporated herein by reference.

The present invention relates to a masa foodstuff. In particular, the present invention relates to a masa foodstuff comprising a modified protein wherein the unmodified protein is native to corn.

Corn provides the base ingredient for many staple foodstuffs. For example, corn may be processed to produce masa. Masa is the raw material for production of products such as corn tortilla, soft tortilla, corn chips, tortilla chips, taco shells, tamales. Masa is produced by a nixtamalisation process (also called alkaline cooking process). The nixtamalisation process involves cooking corn which still carries its outer shell (the pericarp). The cooking is performed in an alkaline solution such as lime (calcium hydroxide) and generally is for 12 to 24 hours. The cooked product is then steeped and washed to produce nixtamal. The nixtamal is then stone-ground to a soft moist dough called masa.

For the convenience of a domestic user or for some commercial users, it is desirable to provide the dry flour, or instant tortilla flour, that is called masa harina. Certain known processes for making masa harina include U.S. Pat. No. 826,983 disclosing steeping corn in the traditional manner, followed by drying the kernels and grinding into flour. U.S. Pat. No. 987,560 teach a process for partially boiling corn in calcium hydroxide solution and then grinding the wet kernels into paste. Water is pressed from the paste, followed by drying of press cake in a heated chamber, followed in turn by grinding into flour. A similar process is disclosed in U.S. Pat. No. 1,262,144 where the amount of lime in water is one-half percent, and in U.S. Pat. No. 1,334,366 calls for molding of dough into small thin cakes which are dried and then ground into flour. A similar process is described in U.S. Pat. No. 2,584,893.

U.S. Pat. No. 2,704,257, U.S. Pat. No. 2,854,339 and U.S. Pat. No. 2,930,699 disclose steeping of corn in calcium hydroxide solution at a temperature well below the gelatinisation point of starch of the corn, followed by drying of the whole steeped corn in a hot airstream while simultaneously comminuting it to obtain a flour which has been dried at temperatures less than 74° C. to a moisture content of not more than 10% by weight. The patents also describe apparatus for use in the drying and grinding steps.

U.S. Pat. No. 4,463,022 discloses a method for producing masa comprising the steps of placing the dry corn kernels in a vessel of boiling water and maintaining the water boiling for about five minutes. Heat is removed from the vessel, and the water and corn kernels are allowed to cool for about two hours under ambient conditions, bringing the temperature down to about 160° F. The corn kernels are then further cooled and washed by establishing a low volume flow of cool tap water through the vessel for about an additional two hours. Following this treatment, the hulls of the kernels are broken by passing the kernels through a set of crushing rolls spaced apart about one-eighth of an inch. Thereafter, the mass of hull-broken kernels is entirely, hull and all, forced through a plate perforated as a sieve, the perforations being very small in relation to the size of the corn kernels. This produces a uniform and highly desirable masa product. The moisture content of the mass of material is desirably adjusted to about 50% by weight, either before or after the material is forced through the perforations.

After production masa may then be treated in a number of ways. The masa may be introduced into, for example, a tortilla mold or a tortilla sheeter. This is the traditional end use for the masa. In an alternative, the masa can be dried and milled into a "shelf-stable" flour product. The masa may be reconstituted from the flour product at a later stage and then formed into a food product, such as tortilla.

With regard to industrial implementation, typically masa is sold in the form of the dried masa or is formed into a final food product, such as a tortilla, which is then packed. In both of these aspects, one of the advantages of providing the product in this form is that the end user is freed of the need to prepare the nixtamal and masa from the corn constituent. The requirements for labour, energy and processing time for the end use are reduced. Moreover, the product is simple to use.

Limitations in supply chains, particularly in developing regions which predominantly consume masa based products, require that corn products, such as tortillas, should typically retain their properties for at least 7 days after production.

Additives to corn tortillas and their effects on storage stability are discussed in the prior art. For example, J. C. Yau et al., "Effects of Food Additives on Storage Stability of Corn Tortillas", Cereal Foods World, May 1994, Volume 39, No. 5, 397–402 discusses the incorporation of vegetable and animal proteins, gums, emulsifiers, modified starches and polyols into nixamalised corn flour during processing. The rheological properties (rollability and pliability), machinability, moisture content, and organoleptic properties were evaluated. The properties of the tortilla were measured when the tortilla was cold. Since starch retrogrades under storage, it may be concluded that Yau et al. are concerned with the effects of starch in the tortilla. Yau et al. discuss that at least some of the disclosed additives may provide a gel network which improves the retention of steam and the extent of puffing of corn tortillas on cooking. Moreover, it is discussed that proteins in corn masa do not form a gel network.

Further prior art disclosures of additives to corn masa products are provided by WO 96/39864, WO 95/14397, and U.S. Pat. No. 3,655,385. WO 96/39864 relates to the production of "fat free" corn chips made from corn flour or masa. The chips contain (i) up to 50% masa, (ii) starch, protein or fibre and (iii) a filler. Component (ii) and (iii) are incorporated to reduce the fat content of the corn chips.

WO 95/14397 relates to extruding a cereal grain dough containing a gum such as carboxymethylcellulose (CMC) and an optional protein to provide a product for subsequent frying. The fried food product may be a corn chip. This document teaches that gums are incorporated to allow correct hydration of the starch component of the corn flour. WO 95/14397 relates to the extrusion of a cereal grain—an alkaline treatment step (nixtamalisation) of the grain is explicitly avoided.

U.S. Pat. No. 3,655,385 relates to the prevention of staling in tortillas containing a hydrophilic edible gum. Prevention of staling is said to be achieved by the water retention of the hydrophilic gum.

Whilst the prior art offers various additives which may alter the storage ability or handling characteristics of a masa foodstuff, the prior art teaching offers no solution to the problem of providing tortillas or masa flour which have both good storage stability and/or handling properties.

The present invention addresses the problems of the prior art

According to a first aspect of the present invention there is provided a process for the preparation of a modified masa foodstuff, the process comprising the steps of (i) preparing a masa by nixtamalisation of corn (ii) contacting a reducing agent or an enzyme with (a) the masa, and/or (b) the corn prior to nixtamalisation; such that a protein native to the corn is modified.

By the term "nixtamalisation" it is meant heating corn which still carries its outer shell (the pericarp) in an alkaline solution. Preferably the alkaline solution is an aqueous solution of lime or calcium hydroxide.

The present invention may provide a masa foodstuff having improved handling properties. For example when the masa foodstuff is a tortilla the present invention improves rollability of the tortilla. By the term "improve reliability of the tortilla" it is meant achievement of a higher score than a control tortilla containing 0.5% CMC, when subjected to the Rollability Test described below. Yet further when the masa foodstuff is a tortilla the present invention improves foldability of the tortilla. By the term "improve foldability of a tortilla" achievement of a higher score than a control tortilla containing 0.5% CMC, when subjected to the Foldability Test described below.

The present invention improves the interaction of proteins present in the corn. In the present specification by the term "improving the interaction" or "improve(s) the interaction" it is meant a higher degree of interaction when compared to an aspect not in accordance with the present invention. In other words in the present specification by the term "improving the interaction" or "improve(s) the interaction" it is meant a higher degree of interaction when compared to an unmodified protein.

In the present specification the term "corn" is analogous to the US terminology "maize". In the present specification by the term "corn" it is meant the seed or kernel of a corn or maize plant.

In the present specification by the term "modified protein" it is meant a protein which has been modified from its native state by a reducing agent or an enzyme.

In the present specification by the term "native to corn" it is meant a protein which is present in complete corn.

The proteins in masa foodstuffs are not very interactive. The present invention improves protein interactions either to other proteins or to other components such as lipids and carbohydrate. Thus the handling properties of masa foodstuffs such as strength, elasticity, extensibility, rollability and foldability of tortilla may be improved.

Without being bound by theory it is believed that the properties of masa such as tortilla are enhanced by the present invention because of the effect of the present invention on the native protein of the corn. This is explained in further detail below.

A corn product may be studied under a microscope. It can be observed that the proteins present in an aqueous composition of the corn product tend to group together. This is often observed with proteins but is particularly the case with masa products because the alkaline solution of the nixtamalisation process encourages aggregation of the proteins.

We have found that by "opening up" the proteins which group together the present invention achieves better interaction of the proteins which were native in the corn. The interaction may be improved between the modified proteins and other proteins or between the modified proteins and other constituents of the masa. This improved interaction may be achieved by modifying the proteins with a reducing agent or an enzyme, such as a protease.

This theory is supported not only by our visual studies of the proteins but also by subsequent studies of the strength of tortillas made from corn products containing modified proteins. If an aggressive enzyme, such as an unspecific protease with high activity, is contacted with the corn product, the proteins are modified to such an extent that there is insufficient interaction between them. The strength of the tortilla then diminishes and the tortilla cannot be readily handled. For the reasons discussed below, this may be because the proteins are modified to an extent that substantially no high molecular weight proteins are available to provide an interacting network.

Preferably, the unmodified protein which is modified and/or the protein the interaction of which is improved, is a high molecular weight protein or an aggregate of proteins wherein the aggregate has a high molecular weight. High molecular weight proteins or high molecular weight protein aggregates are important in providing a structure which contributes to the properties of a foodstuff such as a tortilla. Thus modification and/or improvement of the interaction of such a high molecular weight protein or high molecular weight protein aggregates is particularly advantageous. The lesser importance of modification of low molecular weight proteins or low molecular weight protein aggregates is exemplified by our studies described above using an aggressive enzyme, such as an active and unspecific protease. The protease was found to modify the high molecular weight protein to such an extent that the strength of the tortilla diminishes and the tortilla cannot be readily handled.

In the present specification by the term "high molecular weight protein" or "high molecular weight protein aggregate" it is meant a protein or a protein aggregate having a molecular weight of at least 100 kDa. This is preferably measured with a Malvern.

The protein may be modified with an enzyme or a reducing agent. Both modification agents have advantages. By the term "modified" in respect of the protein native to corn it is preferably meant that the conformation of the protein is changed. In one aspect by the term "modified" it is preferably meant that a peptide or disulphite bond of the protein is cleaved.

Enzymes may be contacted with the corn product, such as the nixtamal, the masa or the masa flour. The enzyme modifies the protein native to the corn. The activity of the enzyme may then be readily terminated by heating the enzyme. Heating will denature the enzyme and therefore the activity thereof will cease.

The use of an enzyme is particularly advantageous because denatured enzyme need not be disclosed in a food ingredient listing after denaturation. Food labeling regulations consider enzymes to be processing aids. Denatured enzymes need only be declared as protein.

The activity of reducing agents is easier to control than that of enzymes. However, the reducing agent must be separated from the corn containing food material after contact therewith or, if it remains in the foodstuff, it must be declared in an ingredients list.

Typical enzymes may be selected from proteases such as disulfide isomerase and other enzymes that act on disulfide bonds, bacterial proteases such as GRINDAMYL™ PR 41, and GRINDAMYL™ PR 43, fungal proteases such as GRINDAMYL™ PR 59 (a proteolytic enzyme complex produced from *Aspergillus oryzae*), and mixtures thereof, including mixtures of bacterial and fungal proteases such as GRINDAMYL™ PR 46. Each of GRINDAMYL™ PR 41, GRINDAMYL™ PR 46, GRINDAMYL™ PR 43, and GRINDAMYL™ PR 59, are available from Danisco Ingredients, Denmark.

Preferably, the enzyme is a protease. A proteases may be selected such that a suitable degree of modification of a native corn protein is provided.

Typical reducing agents may be selected from L-cystein, metabisulfite, inactivated yeast extract (glutathione), derivatives and mixtures thereof.

Typically the masa or the corn may be contacted with the enzyme or reducing agent for 5 to 20 minutes, or in one aspect 10 to 20 minutes. This period of contact is usually sufficient to modify the proteins native to the corn to a sufficient degree such that improved interaction between the modified native protein occurs.

In preferred aspect, the present invention may further improve the interaction between native corn proteins and other constituents of the foodstuff such as other native corn proteins or modified corn proteins, lipids or carbohydrates by the addition of a protein matrix forming constituent to the foodstuff/food material. These matrix forming constituents may be selected from non-native protein, including whey protein, bovine serum albumin (BSA), gluten; emulsifiers such as citric acid, including CITREM LR 10, available from Danisco Ingredients, Denmark; hydrocolloids including gums, carboxymethylcellulose (CMC), carrageenan, guar gum, pectin; and mixtures thereof.

Typical emulsifiers may be selected from include CREMODAN® (manufactured and distributed by DANISCO INGREDIENTS) including CREMODAN® DC, CREMODAN® MOUSSE, CREMODAN® SE, CREMODAN® SI, CREMODAN® SIM, CREMODAN® ) SL, CREMODAN® TEF; GRINDSTED™ (manufactured and distributed by DANISCO INGREDIENTS), including GRINDSTED™ BK, GRINDSTED™ CITREM, GRINDSTED™ ES, GRINDSTED™ FF, GRINDSTED™ GA, GRINDSTED™ PS such as GRINDSTED™ PS 100, GRINDSTED™ PS 200, GRINDSTED™ PS 300, GRINDSTED™ PS 400, GRINDSTED™ WP; RECODAN™ (manufactured and distributed by DANISCO INGREDIENTS); RYLO™ (manufactured and distributed by DANISCO INGREDIENTS), including RYLO™ AC, RYLO™ Cl, RYLO™ LA, RYLO™ MD, RYLO™ MG, RYLO™ PG, RYLO™ PR, RYLO™ SL, RYLO™ SO, RYLO™ TG; DATEM (diacetyl tartaric acid esters of monodiglycerides), e.g., PANODAN® (manufactured and distributed by DANISCO INGREDIENTS), CITREM (citric acid esters of monoglycerides) and/or sodium stearoyl lactylate, derivatives and mixtures thereof.

Preferably, the hydrocolloid is selected from CMC, carrageenan, guar gum, pectin and mixtures thereof. In a highly preferred aspect the hydrocolloid is at least a mixture of CMC and carrageenan.

Preferably the hydrocolloid is carrageenan.

Thus in a further aspect there is provided a masa foodstuff comprising corn, wherein the masa foodstuff further comprises carrageenan.

Carrageenan either alone or in combination with other hydrocolloids such as CMC has given positive effects in trials. This may be because of interaction with proteins.

It is to be noted that the combination of carrageenan with an enzyme, such as a protease, or a reducing agent maintains the water holding capacity benefits from the hydrocolloids and network strengthening effect and additionally improves the surface texture of the tortilla.

The present invention is further advantageous because it allows for the use of strong corn or flour from hard milling corn originating from North America, in particular the US. US flour contains protein which has weak interactions due to their compact structure. Thus the present invention allows for the use of this corn in preparing masa foodstuffs in which the handling properties of the product would normally prohibit the use of US flour.

The present invention also provides nutritional advantages. Corn protein is not absorbed by the human digestive tract. By "opening up" the protein structure of corn products, the nutritional value of the masa foodstuffs is increased. Nutritional value is often improved by manufacturers by the addition of soya protein or whey protein to the masa product. Thus, not only does the present invention improve the nutritional value of the masa foodstuff, it also provides an economic benefit because the addition of further protein material is reduced or rendered unnecessary.

It is also believed that a further advantage of the invention is that modified proteins with improved interaction seal the surface of the foodstuff such as a tortilla resulting in a softer and smoother surface.

Preferably, the masa foodstuff of the present invention is selected from corn tortilla, soft tortilla, corn chips, tortilla chips, taco shells, tamales, derivatives and mixtures thereof. More preferably the foodstuff is a tortilla.

In a further aspect of the present invention there is provided a masa foodstuff obtainable or obtained by a process as defined herein.

In a further aspect of the present invention there is provided a masa foodstuff comprising a modified protein wherein the unmodified protein is native to corn.

In a further aspect of the present invention there is provided use of a reducing agent or an enzyme to improve the interaction of a protein in a masa foodstuff, wherein the protein is native to the corn.

In summary, the present invention provides a masa foodstuff in which the interaction of native proteins is improved such that handling and/or texture of the masa foodstuff is improved. Native proteins are modified in such a way that more interactive sites of the proteins are exposed for interactions. In the laboratory effects has been seen using reducing agent such as L-cystein, metabisulfite and inactivated yeast extract (glutathione).

Alternatively enzymes, for example proteases, may be used. Proteases may affect the strength and flexibility of the tortilla in a negative way (to much proteolysis) or in a positive way (mild proteolysis, just opening the protein aggregates). It is possible that the screening of specific proteases may be used to select proteases which can give desired and/or improved results.

Thus in a further aspect there is provided a method for determining the degree of modification of a native corn protein by a protease, wherein the method comprises: (a) contacting a protease of interest with a native corn protein; and (b) determining the extent to which the protease modifies the protein (if at all).

Native corn proteins are not very active compared to proteins present in other food material, for example gluten proteins. The present invention improves the interaction between native proteins and thus improves the properties of masa foodstuffs, such as tortilla. This is achieved by modifying the native protein.

Without being bound by theory, it is believed that the present invention assists in incorporation of carbohydrates such as aribinoxylans and/or lipids in the network of native proteins.

In a preferred aspect gluten may also be incorporated in the masa foodstuff of the present invention. When the masa foodstuff of the present invention is a flour, gluten is preferably added in an amount of 0.1 to 1.5% based on the total weight of the flour. More preferably, gluten may be added in an amount of approximately 0.3 to 1% based on the total weight of the flour. Yet more preferably, gluten may be added in an amount of approximately 0.5% based on the total weight of the flour.

The applicant has found that gluten particularly improves interaction between native proteins and yet further improves the interaction between native proteins and other flour components such as aribinoxylan.

In a further preferred aspect, zein protein is also incorporated in the masa foodstuff of the present invention. Zein protein which is present in the corn outer endosperm is particularly vulnerable to the lime cooking process of nixtamalisation. If zein protein is obtained from an alternative source which is not subjected to lime cooking and added to the masa foodstuff of the present invention, improved properties are observed. Preferably, the zein protein is solubilised from the outer endosperm of corn, freeze dried and then, as described above, added to the foodstuff.

Preferably, a protein matrix forming constituent is also incorporated in the masa foodstuff of the present invention. The matrix forming constituent is used to improve interaction between native corn proteins and other native corn proteins.

In some aspects it has been found that the, proteins, emulsifiers, hydrocolloids may be used in place of as well as in addition to the enzyme or reducing agent of the present invention. Thus in a further aspect the present invention provides use of a substance selected from reducing agents, enzymes, proteins, emulsifiers, hydrocolloids, derivatives and mixtures thereof to improve the interaction of a protein in a masa foodstuff, wherein the protein is native to the corn.

Preferably, the viscosity of an aqueous suspension of the masa foodstuff of the present invention, more preferably a tortilla corn product, is from 5 to 12 cP, more preferably from 5 to 8 cP. Preferably the viscosity is from 6 to 7 cP.

EXAMPLES

The material and methods used in the examples are described below.

Firstly a tortilla model system was developed to provide a simple and rapid model system which can be used to understand and predict the functionality of ingredients in corn tortilla.

Generally speaking, tortilla have been evaluated by different semi-objective tests such as rollability and foldability test. The methods are based on whether the tortilla can tolerate rolling and folding. Unfortunately, such evaluation is subjective. The evaluation may vary depending on which parameters (cracking, dry edges, strength, elasticity, softness etc.) the evaluator believes to be most important. As a consequence of this, it has been difficult to evaluate the way in which different ingredients affect the functionality of the tortilla. Therefore it is important that objective test methods which are described below are applied.

Materials and Methods

Masa dough model and handling conditions: Initially it, is necessary to establish a reproducible masa dough model system which simulates industrial conditions in order to transfer information and experiences from the model system to manufacturers. In order to accomplish this a pilot scale tortilla process was developed. The pilot scale process is described below:

Pilot Scale Corn Tortilla Process

Ingredients:

| | |
|---|---|
| Flour | 100% |
| Salt | 0.3% |
| Ca-propionate | 0.5% |
| Inhibitor - fumaric acid | 0.5–1.25% depending on flour |
| Water | 130–150% depending on flour |
| | FU should be 270–300 at 35° C. |

Kneading and masa dough handling conditions: Kneading is conducted at ambient temperature in a Bjorn mixer at lowest speed. Dry mixing for 5 min. followed by 1 min. after addition of water. Masa dough temperature should be 35° C. (water temperature approximately 45° C.).

Following mixing the masa dough is rested at 35° C. 85% RH for 10 minutes before baking in a corn/flour tortilla oven (model CFO-40) with the following temperature settings:

| | |
|---|---|
| Top: | 250–300° C. |
| Middle: | 230–270° C. |
| Bottom: | 140–190° C. |

Packing Conditions:

After baking the tortilla are cooled at 25° C. 80% RH for 10 minutes. before packing in plastic bags (10 pieces/bag). The packed tortilla are kept at ambient temperature between the evaluations.

Evaluation:

conducted over a period of 14 days depending on the results obtained.

Rollability Test:

6 wooden sticks having diameters of from 5 mm to 18.6 mm are provided, around which the tortilla is rolled. The evaluation is conducted after warming the tortilla up at approximately 250° C. for 15 seconds on each side followed by 10 seconds on the first side (baked once in the gas oven)

The tortilla are rolled from thickest to thinnest stick. The number of stick at which the tortilla cracks is noted. The best tortilla are therefore given the highest number.

Foldability Test:

The tortilla are folded in four and pressed lightly at the folds to see whether the folds remain intact after applying pressure.

In principle these tests simulate the treatment applied during eating.

Puffing:

the degree of puffing was evaluated and scored. Scoring depends on whether there are a few large puffs (high score, highest=5), or many small or none (lowest score, lowest=1).

Surface Texture:

Roughness and glassy (raw spots) areas are evaluated as negative. The best tortilla are given score 5 while tortilla with poor surface texture are given a lower score.

Characteristics of Control/Standard Pilot Masa Dough:

The methods used to characterize the masa dough are described in detail in the section: Development of laboratory scale masa dough model system.

pH:

Optimal at 5.1–5.4 to reduce microbial growth.

Masa Dough Temperature After Kneading:

35° C.

Masa Dough Consistency:

270–300 FU (Farinograph units)

Masa Dough Liquor Viscosity:

2.5–12.0 cP (under the conditions used water has a viscosity of 1.5 cP—the method is described in detail in the section entitled masa dough liquor analysis) depending on the used flour and which types of hydrocolloids are mixed such as CMC.

Development of Laboratory Scale Masa Dough Model System

On the basis of the developed pilot scale trials and the characterized standard masa dough, a masa dough model system and several objective evaluation methods were developed to understand and characterize the effect of different ingredients and process conditions on corn tortilla.

Masa Dough Model System

| Ingredients: | |
|---|---|
| Nixtamal flour | 300 g |
| Salt | 1.5 g |
| Ca-propionate | 0.75 g |
| Inhibitor | 1.5 g (is variable pH should be 5.1–5.4) |
| Water | to 280 FU (temperature 45° C.) |

Mixing:

conducted in a Hobart mixer 2 minutes dry mixing with a paddle at speed 1 followed after water addition by 22 seconds at speed 2. The paddle is replaced by a masa dough hook and mixing is continued for further 1 minute at speed 2.

Continued mixing or higher energy input mixing results in improved tortilla until the point where the masa dough becomes sticky (see results in table below.)

Effects of Mixing on Masa Dough and Tortilla

| Sample | machinability | cP | OD 280 nm | Rollability |
|---|---|---|---|---|
| control 1 min | | 7.4 | 0.50 | 4.3 |
| mix 2 min | | 8.2 | 0.57 | 4.5 |
| mix 3 min | | 9.8 | 0.56 | 4.8 |
| mix 4 | sticky | n.d. | n.d. | n.d. |

The masa dough is rested at 35° C. at 85% RH for 10 minutes before analysis and baking are conducted.

Masa Dough Analysis:

Masa Dough Consistency Measurements:

performed in a Brabender farinograph with a 50 g kneading chamber. The measurements are conducted on 75 g of tortilla masa dough after the 10 minutes resting period at 35° C. at lowest speed (63 rpm). The temperature of the kneading chamber is set to 35° C. and the measurements are conducted for 7 minutes in order to equilibrate the system. If the masa dough consistency measurements falls outside 270–310 FU a new masa dough is prepared after adjusting the water level.

pH Measurements:

10 g of tortilla masa dough are homogenised using an Ultra Turrex at 8000 rpm for 20 seconds after adding 90 g of water. The pH measurements are conducted on the masa dough slurry. If measurements are unstable the measurement can be conducted on the supernatant after centrifugation for 4 minutes at 10000 rpm (10800 g-value).

Masa Dough Liquor Extraction and Analysis:

2×6 g of masa dough are weighed. 10 ml of distilled water is added to 50 ml centrifuge tubes. The masa dough and water are homogenized using an Ultra Turrex for 20 seconds at 8000 rpm followed by 40 seconds at 20500 rpm. The suspension is centrifuged at 10000 rpm (10800 g-value) for 4 minutes. 0.5 ml of the supernatant is used for viscosity determination in a Brookfield viscometer. The measurements are conducted at 11° C. at 5, 10 and 20 rpm. For protein determination O.D. is measured at 280 nm after 30 times and 60 times dilution of the supernatant.

Rheological Analysis Using a Texture Analyzer TA-XT2i.

Modified Stickiness Test:

The measurements are conducted essentially as described by Hoseney and Chen 1992 ("Dough stickiness, causes and measurements" Weizhi Chen, Manhattan, Kans. 1992) except that the cells are kept in contact with the masa dough for 5 seconds. The results are given in grams. The positive force is the force required to penetrate the masa dough. The negative force is the force required to pull the cells apart from the masa dough.

Baking Procedure:

In the model system the tortilla masa dough is sheeted in a Seewer Rondo by the following process: 15-8-4-2 mm.

Masa dough cylinders of 94 mm in diameter are punched out from the masa dough sheet using metal rings. The masa dough pieces are baked in a BAGO oven at 250° C. for 2 minutes and 30 seconds. The -"tortilla" are cooled at 25° C. and 80% RH for 10 minutes before putting them in sealed plastic bags. The bags are kept at ambient temperature between measurements.

Evaluation of Baked Tortilla Using the Texture Analyzer Penetration Test:

The method is conducted by placing the tortilla in between to metal rings in order to hold the tortilla during the measurement. The setup is as follows: Pre-speed: 10.0 mm/s, Speed: 2.0 mm/s, Post-speed:10.0 mm/s, Distance: 15 mm, Trigger: 0.5 g, PPS: 400 and Option: Return to start.

The results are given by maximum peak force which correlates to the strength of the tortilla network, The distance between the two curves at force 50 g relates to the elasticity of the tortilla. In a totally elastic system the force applied will be returned and therefore there should, in theory, be no difference between the two curves. In practice there will always be a difference because of lost energy due to friction. However, the shorter the distance the more elastic the tortilla are.

The measurements are conducted on warm tortilla (heating conditions as described in the pilot scale method) which have been rested for 5 minutes in cloth in order to equilibrate the tortilla (water distribution) before measurement. These conditions simulates normal eating conditions.

Tortilla Analysis:

Weight:

The tortilla are weighed during the evaluation period.

Viscosity, Protein Determination and pH Measurements of Extracted Tortilla Liquor:

To 5 g of tortilla crumbs (milled in a Braun mill for 20 seconds at speed 2) 6.5 ml distilled is added followed by homogenization in an Ultra Turrax for 20 sec. At 8000 rpm and 40 sec. At 20500 rpm. The tortilla suspension is centrifuged at 10000 rpm (10800 g-value) for 4 min. at ambient temperature. The supernatant is used for pH measurements and for viscosity and protein determination as described above in masa dough liquor extraction and analysis paragraph.

Water Content Determinations:

Approximately 0.5 g of tortilla crumbs (milled as described above) are used for water content determinations using a Mettler Pm 100 at 160° C.

The following Examples demonstrate that, as discussed above, the protein-network necessary to obtain strong and flexible tortilla can be obtained by different strategies.

Example 1

Proteases and Reducing Agents

TS-E 486—mild protease
TS-E 514—papain (a proteolytic enzyme)
TS-E 512–12 wt. % papain and 88 wt. % L-cystein, and
TS-E 513–21 wt. % papain and 79 wt. % L-cystein, and
L-cystein/SMS (sodium metabisulphite)

| Product | Dosage on flour | Rollability day 7/day 11 | Surface & texture | Puffing | Masa dough liquor cP | Masa dough liquor O.D. 280 nm | Water % in tortilla |
|---|---|---|---|---|---|---|---|
| Control | | 4/3 | 4 | 3 | 3.0 | 0.17 | 46.2 |
| TS-E 486 | 175 ppm | 4/3.5 | 5 | 3 | 3.5 | 0.17 | 47.9 |
| TS-E 514 | 150 ppm | 4/3.5 | 4 | 3 | 4.2 | 0.22 | 48.3 |
| TS-E 512 | 170 ppm | 5/4 | 5 | 3 | 3.5 | 0.17 | 47.0 |
| L-cystein | 75 ppm | 4.5/4 | 4 | 3 | 3.2 | 0.17 | 47.0 |
| L-cystein | 125 ppm | 5/4 | 4 | 3 | 3.5 | 0.19 | 47.2 |

TS-E 486, TS-E 514, TS-E 512 and TS-E 513 are all available from Danisco Ingredients, Denmark.

Parallel positive effects have been observed using other proteases and reducing agents such as SMS (sodium metabisulphite) and hydrolyzed yeast.

To obtain positive results using proteases and reducing agents one should not reduce viscosity in comparison with control and likewise one should not substantially increase the level of protein in the masa dough liquor to much in comparison with the control. If the protein aggregates become to small the tortilla strength is reduced.

It can be seen from the above data that the contact of the masa with reducing agent, proteolytic enzyme or a combination of the two, achieved superior reliability and masa dough liquor viscosity.

Example 2

Reducing Agents, Enzymes and Interaction Improver (Carrageenan)

The following products were contacted with a masa product and the resultant modified foodstuff was compared to a control TS-E 486—mild protease
TS-E 514—papain (a proteolytic enzyme)
TS-E 512—papain and L-cystein
TS-E 513—papain and L-cystein L-cystein
CL 110—carrageenan (available from Danisco Ingredients, Denmark)

Ingredients:
100 kg Masa Pura (Nixtamal, 60% Water)
60 kg corn flour containing 0.5% CMC
75 kg water (45° C., optimal)
580 g salt
220 g CMC
1250 ml 2% preservative.

Mixing:
The mixing conditions were as follows:
1. Dry mixing for 2 minutes.
2. Water and enzymes were added and mixed for further 2 minutes and 20 seconds at low speed in a Morton type mixer.
3. The optimal masa dough temperature in the process used after mixing is around 35–37° C.

| Temperature: | 380° C. in the oven | (in tortilla 65° C.) |
|---|---|---|
| | 370° C. | (70–75° C.) |
| | 330° C. | (85° C.) |

The tortillas are packed in polyethylene plastic bags of low density.

Results

| Sample | Ingredients | Dosage | Masa temp ° C. | Masa Nixt ° C. | Water temp ° C. | Masa pH (Day 1) | Tortilla pH (Day 1) | Masa water % (Day 1) | Tort. water % (Day 1) | Tortilla water % (Day 13) |
|---|---|---|---|---|---|---|---|---|---|---|
| 1 | TS-E 486 | | 35–37 | 37 | 45 | 5–5.4 | 5–5.4 | 58–60 | 47–48 | |
| Control | Control | | 35.6 | | 35 | 5.7 | 5.6 | 58.6 | 46.3 | 46.18 |
| 2 | TS-E 486 | 190 ppm | 31 | | 35 | 5.5 | 5.5 | 58 | 47.5 | 45.52 |
| 3.1 | TS-E 486 | 175 ppm | 30 | | 34 | 5.7 | 5.7 | 56.8 | 47.6 | 46.31 |
| 3.2 | TS-E 486 | 175 ppm | 33 | 31 | 41 | 5.9 | 5.7 | 59.2 | 48.4 | 46.62 |
| 4 | TS-E 513 | 20 ppm papain + 75 ppm L-cystein | 32 | 31 | 37 | 5.8 | 5.8 | 57 | 46.1 | 46.71 |
| 5 | TS-E 512 | 20 ppm papain + 150 ppm L-cystein | 33 | 36 | 35.5 | 5.85 | 5.8 | 58.5 | | 45.80 |
| 6 | TS-E 514 | 150 ppm papain | 32.4 | 34 | 35 | 5.9 | 5.7 | 57.8 | | 45.88 |
| 7 | CL 110 | 1% | 32.3 | 32 | 35 | 5.7 | | 57.7 | | 46.89 |
| 8 | CL 110, papain & L-cystein | 1% CCL + 25 ppm papain + 50 ppm L-cystein | 33 | 31 | 35 | 5.65 | | 58 | | 46.69 |

Discussion and Conclusions:

The optimal pH in Masa and tortilla should generally speaking be around 5–5.4. In all our trials the pH was above 5.6. Shelf life is affected by pH. The tortilla normally only last for 3 days if pH is around 6.

Results of reliability test of tortilla conducted at different days and masa dough liquor analysis of Masa (dough) on the 4/2.

| Sample | Ingredient | Day 1 | Day 5 | Day 7 | Day 10 | Day 12 | Masa cP | Masa OD 280 nm |
|---|---|---|---|---|---|---|---|---|
| Control | — | 5 | 5 | 4.5 | 4 | | 3.5 | 0.170 |
| 1 | TS-E 486 | 5+ | 5 | 5 | 4–4.5 | 3 | 3.8 | 0.185 |
| Control | — | 5 | 5 | 4 | 3.5–4 | | 3.0 | 0.145 |
| 2 | TS-E 486 | 5 | 5 | 4.5 | 3 | 1.5 | 5.5 | 0.190 |

-continued

| Sample | Ingredient | Day 1 | Day 5 | Day 7 | Day 10 | Day 12 | Masa cP | Masa OD 280 nm |
|---|---|---|---|---|---|---|---|---|
| 3.1 | TS-E 486 | 5 | 4.5–5 | 4 | 3–3.5 | 2.5 | 3.5 | 0.163 |
| 3.2 | TS-E 486 | 5 | 4.5–5 | 4 | 3–3.5 | 2.0 | 3.8 | 0.171 |
| 4 | TS-E 513 | 5 | 4.5 | 4.5 | 3.5 | 1.5 | 3.6 | 0.183 |
| 5 | TS-E 512 | 5+ | 5+ | 5 | 4 | 2.5 | 3.5 | 0.171 |
| 6 | TS-E 514 | 5 | | | 3.5–4 | 2 | 4.2 | 0.220 |
| 7 | CL 110 | 5 | 5 | 5 | 3.5–4.5 | 3 | 4.6 | 0.190 |
| 8 | CL 110, papain & L-cystein | 5+ | 5+ | 5 | 4–4.5 | 3.5 | 5.3 | 0.215 |

Whilst the products of the present invention generally showed improved properties in comparison to the control. TS-E 486 showed some interesting effects just after baking—the tortilla were very soft. This could be a consequence of side activities acting at carbohydrate level. After checking side activities both xylanases and glucanases were detected. Negative effects of glucanases in combination with CMC have been seen. The product can be beneficial is used with other types of hydrocolloid such as guar. Glucanases can, in combination with non-degradable hydrocolloids, give softening effects of the tortilla which are of interest to manufacturers of corn food products.

| Sample | Ingredients | Texture subjective evaluation | 2/2 DI weight g/tortilla | cP tortilla 5 g in 6.5 g water | OD in tortilla | Masa cP | Masa OD 280 nm |
|---|---|---|---|---|---|---|---|
| 1 control | TS-E 486 | soft, fragile | 25 | 2.80 2.77 | 0.361 0.336 | 3.8 | 0.185 |
| | | | 27 | 3.69 3.49 | 0.390 0.377 | 3.0 | 0.145 |
| 2 | TS-E 486 | soft, fragile | 24 | 3.46 3.37 | 0.361 0.352 | 3.5 | 0.190 |
| 3.1 | TS-E 486 | soft, fragile | 27 | 3.37 3.44 | 0.341 0.270 | 3.5 | 0.163 |
| 3.2 | TS-E 486 | soft, fragile | 27 | 2.93 2.88 | 0.315 0.276 | 3.8 | 0.171 |
| 4 | TS-E 513 | | 28 | 3.46 3.46 | 0.370 0.232 | 3.6 | 0.183 |
| 5 | TS-E 512 | soft, flexible | 25.5 | 3.53 3.56 | 0.330 0.318 | 3.5 | 0.171 |
| 6 | TS-E 514 | | 24.5 | 4.15 4.12 | 0.354 0.361 | 4.2 | 0.220 |
| 7 | CL 110 | Rough, soft | 27 | 4.73 4.74 | 0.376 0.361 | 4.6 | 0.190 |
| 8 | CL 110, papain & L-cystein | soft, flexible | 28 | 5.58 5.60 | 0.403 0.428 | 5.3 | 0.215 |

It is possible to improve tortilla surface texture and shelf-life by combining some hydrocolloids (here carrageenan in the form of CL 110) with protein modifying products (L-cystein and proteases).

There is correlation between the masa dough liquid analyses (viscosity and OD 280 nm) from tortilla masa and the finish tortilla product.

The combination of papain and L-cystein has resulted in good effects. From laboratory trials we know that cystein alone can improve shelf-life.

Example 3

Enzymes or Reducing Agents in combination with Hydrocolloids

Products were further developed and tested in pilot scale trials. The effects of some of the developed products are described below.

Samples
1. Control (without CMC) 140% water
2. 0.5% CMC+142% water
3. 0.5% CMC 1250+1% TS-B 746+145% water
4. 0.5% CMC 1250+1% TS-B 747+145% water
5. 0.5% CMC 1250+1% TS-B 748+145% water
6. 0.5% CMC 1250+1% TS-B 749+145% water
7. 0.5% TS-B 768+142% water
8. 1% TS-B 769+142% water
9. 0.25% TS-B 768+141% water
10. 0.5% TS-B 769+141% water
11. 1% TS-B 746+143% water
13. Gluten Sigma
14. Gluten bakers
15. 0.75% GRINDSTED™ CITREM LR 10+0.3% Guar 1400+142% water
16. Control+0.3% Guar 1400+142% water TS-B 746, TS-B 747, TS-B 748, and TS-B 749 are combinations of carrageenan (0.5%–2%), CMC (0.2–0.5%) and reducing agents (50–500 ppm). TS-B 768 and TS-B 769 are combinations of guar, proteases and xylanases. TS-B 768 is composed of TS-E 574 in an amount of 1–10% and the remainder Guar gum. TS-B 769 is composed of vital gluten (25%–75%), TS-E 574 (ranging from 1–10%) and Guar gum (20%–70%). TS-E 574 is an enzyme product containing both proteolytic and xylolytic activities which is obtained by fermentation of fungal and bacterial strains. Each of these products is available from Danisco Ingredients, Denmark.

Ingredients and Baking Procedure

| Flour (without CMC) | 1500 g |
|---|---|
| Salt | 4.5 g |
| Ca-propionate | 7.5 g |

-continued

| | |
|---|---|
| Fumaric acid | 4.5 g |
| Water | 2070 g (FU - 270–300 at 35° C.) |

The masa dough was kneaded, handled and packed as described above under Materials and Methods. Masa dough liquor was extracted and analysed as described under Materials and Methods Evaluation of baked tortilla is conducted over a period of 11 days depending on the results obtained.

Results

| No. | Penetration peak force g + −2 | Adhesion force −g + −5 | Masa liquor viscosity cP + −0.2 | OD 280 nm |
|---|---|---|---|---|
| 1 | 200 | 160 | 1.96 | 0.218 |
| 2 | 210 | 150 | 4.21 | 0.372 |
| 3 | 170 | 140 | 5.38 | 0.194 |
| 4 | 180 | 130 | 5.52 | 0.225 |
| 5 | 150 | 120 | 5.41 | 0.197 |
| 6 | 150 | 120 | 5.61 | 0.211 |
| 7 | 200 | 140 | 3.74 | 0.182 |
| 8 | 190 | 130 | 3.16 | 0.173 |
| 9 | 200 | 140 | 2.65 | 0.186 |
| 10 | 180 | 140 | 2.34 | 0.181 |
| 11 | 170 | 140 | 1.81 | 0.185 |
| 12 | 180 | 140 | 2.62 | 0.273 |
| 13 | 190 | 130 | 2.47 | 0.255 |
| 14 | 160 | 120 | 3.23 | 0.186 |
| 15 | 190 | 130 | 3.23 | 0.180 |
| 16 | | | NOT DETERMINED | |

| Sample no. | Surface 1 rough 5 smooth | Puffing score 1(none)–5 | Rollability score 1–6 (best) day 1 | Rollability day 7 | Rollabilty day 9 |
|---|---|---|---|---|---|
| 1 | 1 | 1–2 | 2 | 1 | 1 |
| 2 | 3 | 3 | 3–4 | 2 | 1 |
| 3 | 3 | 1 | 4 | 5 | 4–5 |
| 4 | 3 | 1 | 3–4 | 3 | 2 |
| 5 | 3 | 1 | 4 | 1–2 | 2 |
| 6 | 3 | 2 | 6 | 3 | 2–3 |
| 7 | | | | | |
| 8 | 4 | 3–4 | 3 | 2 | 2 |
| 9 | 4 | 2–3 | 5 | 3–4 | 4–5 |
| 10 | 4 | 3 | 4 | 2–3 | 2 |
| 11 | 3 | 3 | 6 | 4 | 3–4 |
| 12 | 2 | 2 | 3 | 2–3 | 1–2 |
| 13 | 3 | 3 | 5 | 3 | 2–3 |
| 14 | 3 | 2 | 5 | 3 | 2–3 |
| 15 | 4 | 3 | 3–4 | 3 | 2–3 |
| 16 | 4 | 4 | 3 | 2 | 2 |

The results demonstrate that the products of the present invention containing a reducing agent, in particular TS-B 746 and TS-B 749, are better than the control using 0.5% CMC. TS-B 746 and TS-B 749 are based on carrageenan and reducing agents. When these products are used together with CMC it is possible to reduce the CMC to half the usual level and still obtain a very soft and flexible tortilla.

Example 4

Enzyme and Guar

The functionality of Nixtamal masa was examined.

All TS-B products (TS-B 768, 769, 778, 779, 780) contain Guar 1400 and TS-E 574 which is an enzyme product containing both proteolytic and xylolytic activities which is obtained by fermentation of fungal and bacterial strains. Each of these products is available from Danisco Ingredients, Denmark First trial

| | |
|---|---|
| 2 - Control | |
| 3 - with TSB 769 (0.5%) | without CMC |
| 4 - with TSB 768 (0.3%) | without CMC |
| 5 - with TSB 769 (1.0%) | without CMC |
| 6 - with TSB 768 (0.6%) | without CMC |
| 7 - with TSB 769 (0.75%) | without CMC |

Second trial

| | |
|---|---|
| 2 - Control | |
| 3 - with TSB 769 (0.5%) | without CMC |
| 4 - with TSB 768 (0.3%) | without CMC |
| 5 - with TSB 769 (1.0%) | without CMC |
| 6 - with TSB 768 (0.6%) | without CMC |
| 7 - with TSB 769 (0.75%) | with CMC |
| 8 - Control | |
| 9 - with TSB 746 (1.0%) | with CMC |
| 10 - with TSB 746 (1.0%) | without CMC |
| 11 - with TSB 749 (1.0%) | with CMC |
| 12 - with TSB 749 (1.0%) | without CMC |
| 13 - Thick control | |

Third trial

| | | | |
|---|---|---|---|
| 1 - Control (flour without CMC) + | 0.5% CMC | 39° C. | |
| 2 - TSB 779 | " | 1.00% | 43° C. |
| 3 - TSB 780 | " | 1.00% | 44° C. |
| 4 - TSB 778 | " | 0.60% | 43° C. |
| 5 - TSB 769 | " | 1.00% | 46° C. |
| 6 - TSB 768 | " | 0.60% | 44° C. |
| 7 - Control | " | 0.5% CMC | 45° C. |
| 8 - Control (flour with CMC) | | 0.24% CMC | 45° C. |
| 9 - TSB 779 | " | 1.00% | 45° C. |
| 10 - TSB 780 | " | 1.00% | 45° C. |
| 11 - TSB 778 | " | 0.60% | 47° C. |
| 12 - TSB 769 | " | 1.00% | 46° C. |
| 13 - TSB 768 | " | 0.60% | 46° C. |
| 14 - Control (without CMC) | | 0.50% | 46° C. |
| 15 - TSB 779 (without CMC) | | 0.50% | 46° C. |

Floor time 5 min. without CMC it was 2 l more water
Nixtamal temperature 47° C. in the masa dough
Nixtamal pH 4.99

Ingredients and Baking Procedure:

| Product (control) | kg |
|---|---|
| Nixtamal | 120.00 |
| Flour (0.5% CMC) | 40.00 |
| Water | 53.00 |
| Salt | 0.580 |

| Product (control) | kg |
|---|---|
| CMC | 0.240 |
| Preservative | 0.200 |

Kneading and Masa Dough Handling Conditions:

Mixing dry for 2.5 min. water addition 56 l for sample 1–7+14–15.

Water addition 54 for the rest of samples.

Mixing with water for 2.5 min.

Rest before baking approx. 5–10 min.

Top: 250–300° C. Middle:230–270° C. Bottom: 140–190° C.

pH Measurements of Masa:

10 g of masa is suspended with 90 g of distilled water and stirred by a magnetic stirrer for 10 min before pH measurements are conducted on the slurry.

Evaluation of baked tortilla is conducted over a period of 14 days depending on the results obtained.

Tortilla Liquor Results

Results from Tortilla Liquor Analysis

| No. | CP day 4 - filtered | OD day 4 280 nm | cP day 12 | OD day 12 |
|---|---|---|---|---|
| 1 | 4.3 | 0.570 | 4.51 | 0.460 |
| 2 | 6.6 | 0.460 | 4.47 | 0.380 |
| 3 | 5.9 | 0.288 | 5.24 | 0.324 |
| 4 | 5.4 | 0.280 | 5.92 | 0.374 |
| 5 | n.d. | 0.393 | 4.02 | 0.309 |
| 6 | 5.3 | 0.258 | 4.63 | 0.309 |
| 7 | 4.0 | 0.401 | 4.41 | 0.403 |
| 8 | 6.4 | 0.570 | 3.43 | 0.494 |
| 9 | 5.5 | 0.555 | 4.84 | 0.552 |
| 10 | 6.5 | 0.506 | 5.98 | 0.569 |
| 11 | 9.0 | 0.596 | 6.59 | 0.632 |
| 12 | 5.4 | 0.529 | 4.38 | 0.531 |
| 13 | 6.3 | 0.505 | 4.26 | 0.501 |
| 14 | 5.3 | 0.554 | 3.77 | 0.489 |
| 15 | 4.8 | 0.500 | 3.71 | 0.469 |

Plant trials for TS-B 768 and TS-B769

| Trial 1 | | | | | | |
|---|---|---|---|---|---|---|
| Day | 2 | 3 | 4 | 5 | 6 | 7 |
| 4 | 6 | 4.5 | 1 | 6 | 6 | 6 |
| 7 | 5 | 5 | 4.5 | 6 | 5 | 6 |
| 7 | 5.5 | 5 | 3 | 5 | 4 | 6 |
| 7 | 5 | 5 | 3 | 6 | 6 | 5.5 |
| 11 | 4 | 3.5 | 2.5 | 4 | 4.5 | 3.5 |
| 14 | 3.5 | 1 | 1 | 3 | 3 | 2.5 |
| Average | 4.83 | 4.00 | 2.50 | 5.00 | 4.75 | 4.92 |

Plant trials for TS-B 768, TS-B 769 and TS-B 749 using flour containing CMC

| Trial 2 | | | | | | | | | | | | | |
|---|---|---|---|---|---|---|---|---|---|---|---|---|---|
| Day | 2 | 3 | 4 | 5 | 6 | 7 | 8 | 9 | 10 | 11 | 12 | 13 | CL1 |
| 3 | 4.5 | 5.5 | 2 | 6 | 5.5 | 3.5 | 6 | 5.5 | 5.5 | 6 | 6 | 5 | 5.5 |
| 6 | 5.5 | 5.5 | 2 | 6 | 5.5 | 5.5 | 5.5 | 4 | 4 | 5 | 6 | 4.5 | 5 |
| 10 | 4.5 | 4.5 | 3 | 4.5 | 5.5 | 4 | 4.5 | 4 | 3.5 | 3.5 | 4.5 | 3.5 | 4.5 |
| 13 | 2 | 4 | 4 | 4.5 | | 4.5 | | | 4 | 4.5 | 5 | 3.5 | |
| Average | 4.25 | 4.88 | 2.75 | 5.25 | 5.50 | 4.33 | 5.13 | 4.50 | 4.25 | 4.75 | 5.25 | 4.25 | 5.00 |

Plant trials using TS-B 768, 769, 778, 779, 780 both with flour without CMC (sample 1–7) with CMC (8–14)

| Trial 3 | | | | | | | | | | | | | | | |
|---|---|---|---|---|---|---|---|---|---|---|---|---|---|---|---|
| Day | 1 | 2 | 3 | 4 | 5 | 6 | 7 | 8 | 9 | 10 | 11 | 12 | 13 | 14 | 15 |
| 3 | 4 | 4.5 | 4.5 | 4 | 4.5 | 3 | 3 | 4 | 4.5 | 5.5 | 5.5 | 4.5 | 4 | 4.5 | 4 |
| 6 | 3 | 4 | 2 | 4.5 | 3 | 2 | 2 | 2.5 | 4.5 | 5.5 | 5.5 | 3 | 2 | 1.5 | 4 |
| 10 | 1.5 | 1 | 1 | 1 | 1 | 2 | 1.5 | 2.5 | 3.5 | 4.5 | 4 | 3 | 1.5 | 1.5 | 2.5 |

-continued

Trial 3

| Day | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 14 | 1 | 1 | 1 | 1 | 1 | 1 | 1 | 1 | 1.5 | 4 | 4 | 2 | 1.5 | 2 | 2 |
| Average | 2.50 | 2.63 | 2.13 | 2.63 | 2.50 | 2.00 | 1.88 | 2.50 | 3.50 | 4.88 | 4.75 | 3.13 | 2.25 | 2.38 | 3.13 |

The results in the table above (Results from tortilla liquor analysis) demonstrate the OD 280 nm values of the developed TS-B products in the process using flour without CMC in comparison to the control. The opposite effect is seen in the trials (8–13) where CMC containing flour is used. This indicates that the proteins have interacted better in the trials 2–6 and consequently improved rollability. The exact mechanisms need to be studied further to verify this hypothesis.

All TS-B products are better than control up to day 7. In particular, the TS-B 769 based products are very strong and flexible. After day 7 the TS-B 769 based products seem to become more fragile while the TS-B 768 products maintain their force and flexibility. The water content in the tortilla without CMC (trials 1–7) is higher after 13 days even if the plastic bags have been opened during tortilla evaluation (4 times). There seems to be a negative correlation between the solubilised protein (OD 280 nm) and the water content.

The developed products function in industrial trials. When using the developed products it is possible to eliminate the use of CMC and thereby obtain improvements with the addition of CMC. The products can be of interest economically because a cheaper flour can be used, CMC can be eliminated and laboratory trials have demonstrated that it is possible to maintain the positive effects after addition of 1–2% of water.

Example 5

Study of Reducing Agent on Proteins

The following products were studied:
TS-B 785 and TS-B 786—composed of guar (ranging from 80% to 99%) combined with the reducing agent SMS (ranging from 1% to 20%).
TS-B 787 and TS-B 788—composed of SMS (1–20%), gluten (ranging from 25%–75%) and the remainder guar gum.
Materials and Methods.
Samples:
1. Control (with 0.5% CMC)
2. 0.6% TSB 785
3. 0.6%.TSB 786
4. 0.6% TSB 787
5. 0.6% TSB 788
6. Guar 1400 0.6%
Ingredients and Baking Procedure:

| Flour (without CMC) | 1500 g |
|---|---|
| Salt | 4.5 g |
| Ca-propionate | 7.5 g |
| Fumaric acid | 4.5 g |
| Water | (FU should be 270–300 at 35° C.) |

The following conditions and tests were performed as described above under the generally applicable materials and methods Pilot scale process including, kneading and masa dough handling conditions, oven and packing conditions
Masa liquor extraction and analysis
Rollability test
Surface texture evaluation The evaluation of baked tortilla was conducted over a period of 11 days depending on the results obtained.

After the masa liquor extraction and analysis, the liquor proteins were reduced and separated by SDS-PAGE in a NOVEX system using 8–16% polyacrylamide gradient gel followed by silver staining.
Results

| | Masa liquor analysis | | |
|---|---|---|---|
| No. | Products | cP 5 rpm | OD 280 nm 50 × dilution |
| 1 | CMC | 7.2 | 0.913 |
| 2 | TS-B 785 | 5.2 | 0.286 |
| 3 | TS-B 786 | 5.3 | 0.225 |
| 4 | TS-B 787 | 8.0 | 0.250 |
| 5 | TS-B 788 | 8.4 | 0.253 |
| 6 | Guar 1400 | 7.1 | 0.202 |

| | Tortilla evaluation | | | |
|---|---|---|---|---|
| Sample no. | Surface smoothness | Rollability day 3 | Rollability day 5 | Rollability day 7 |
| 1 | 3 | 4.5 | 4.5 | 3.5 |
| 2 | 4 | 4.5 | 3.5 | 4 |
| 3 | 5 | 5 | 5 (3) | 4.5 |
| 4 | 4 | 5.5 | 5 | 5 |
| 5 | 4 | 5.5 | 6 | 5.5 |
| 6 | 5 | 3.5 | 2 | 2.5 |

Figure 1:
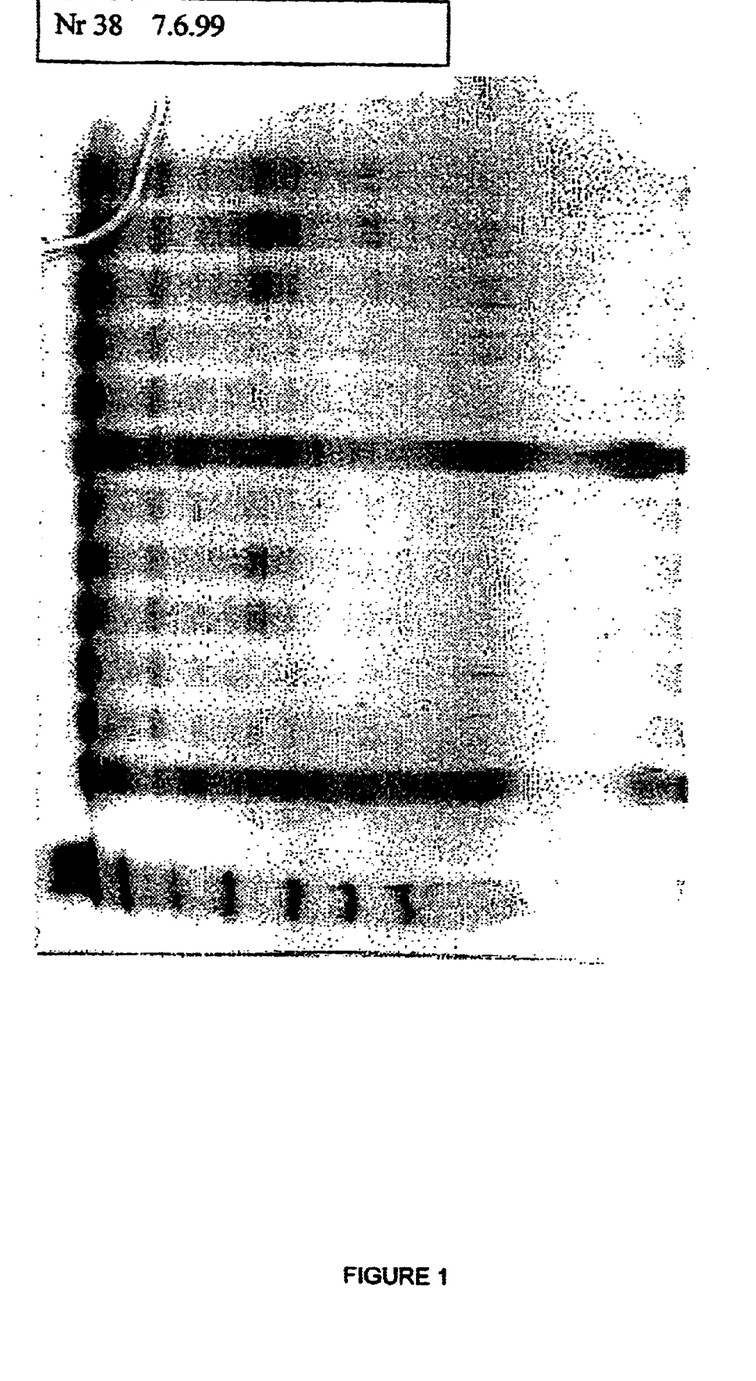

The results of the SDS-PAGE separation of reduced masa liquor protein are shown in FIG. 1. From bottom to top: Lane 1. Marker proteins, 2: blank, lanes: 3–8 from masa pH 6.3. Lane 3:CMC, 4: TS-B 785, 5:TS-B 786, 6: TS-B 787, 7:TS-B 788, 8: guar 1400. Lanes 9–14 masa at pH 5.2. Lane 9: CMC, 10: TS-B 785, 11: TS-B 786, 12: TS-B 787, 13: TS-B 788, 14: Guar 1400.

Using a process at which the pH of the masa is 5.2 demonstrate that the products of the present invention give beneficial effects in comparison to CMC under the given circumstances. The benefits are.

1. The masa dough is less sticky than the control with CMC. The effects can already be seen at the mixing step. Furthermore, the masa dough resistance measured by the Farinograph (BU) is lower than the control. This could be an advantage during the processing where the masa is sheeted before cutting the tortilla out of the masa sheet.

2. During the entire test period the rollability of the tortilla is better for all the TS-B products. The highest rollability was obtained using TS-B 786 and TS-B 788, see "Tortilla Evaluation" table, sample 3 and 5. Subjectively, the tortilla containing these products evaluated as very flexible and strong compared to the control. Using these products it is possible to fold the warm tortilla without comminuting them at least for 7 days. TS-B 785 and TS-B 786 also give very good results in rollability/flexibility test, gives smooth surface, and non sticky masa. The results from the masa liquor analysis demonstrate that the amount of solubilised proteins is decreased. SDS-PAGE of the masa dough liquor proteins confirms that there are less protein bands in the developed products compared to the control containing CMC (see FIG. 1). This could indicate that the proteins have interacted with other components in the formation of a more developed network and thereby resulting in an improvement of the rollability/flexibility of the tortilla.

3. The surface of the tortilla using the products of the present invention is both smoother and softer than the control. There is tendency for TS-B 787 and 788 to have a slightly perforated surface. This could be caused by the lower viscosity (lower hydrocolloid amount—table 1). The effects may be overcome by increasing the dosage.

Example 6

Addition of Interacting Protein

| Product | Dosage on flour | Rollability day 6/day | Surface texture | Puffing | Dough liquor cP | Dough liquor O.D. 280 nm | Penetration force g day 6 |
|---|---|---|---|---|---|---|---|
| Control | | 4 | 4 | 3 | 6.5 | 0.53 | 340 |
| Vital gluten | 0.5% | 5.5 | 5 | 5 | 6.5 | 0.56 | 490 |
| Vital gluten | 1.0% | 5.5 | 4 | 5 | 6.7 | 0.58 | 500 |

The vital gluten improves strength and rollability. The addition of protein does not have drastic effect on masa dough liquor protein content therefore the protein must have interacted with non-soluble corn flour components and thereby given improvements in tortilla strength.

Similar effects have been detected with other proteins such as Zein, Whey protein, BSA, and soya protein. Wheat flour in amount lower than 5% can improve quality but not to the same extent as gluten.

Example 7

Use of Emulsifiers to Improve Protein Network in Corn Tortilla

| Product | Dosage on flour | Rollability day 6/day 13 | Surface texture | Dough liquor O.D. 280 nm | Dough liquor cP | Adhesion of Dough g | Penetration force g day 9 |
|---|---|---|---|---|---|---|---|
| Control | | 4/2.5 | 4 | 0.53 | 6.5 | 27 | 340 |
| Citrem LR 10* | 0.3% | 4/4 | 4 | 0.58 | 6.5 | 20 | 470 |
| Citrem LR 10 | 1.0% | 4/3.5 | 4 | 0.55 | 6.4 | 17 | 460 |

*CITREM LR 10 is available from Danisco Ingredients, Denmark.

The masa dough is softened in comparison to the control but the strength of the tortilla measured by penetration test is increased and so is the flexibility measured by the rollability test.

Example 8

Use of Hydrocolloids to Improve Flexibility, Texture & Machinability and to Increase Water % in Masa Dough & Tortilla

| Product | Dosage on flour | Rollability day 6 | Puffing | Dough liquor O.D. 280 nm | Dough liquor cP | Water % in dough on flour basis |
|---|---|---|---|---|---|---|
| Control | | 3 | 1 | 0.24 | 2.1 | 127 |
| CMC | 0.5% | 4 | 4 | 0.31 | 4.8 | 129 |
| CMC + Carrageenan | 0.5% + 1% | 5 | 5 | 0.27 | 5.3 | 133 |
| Guar 1400 | 0.3% | 3.5 | 4 | 0.25 | 9.3 | 130 |
| Guar 1400 | 1% | 4 | 3 | 0.25 | 12.9 | 132 |

| | Rollability day 10 | Foldability day 10 | Puffing | Surface texture | cP of dough liquor |
|---|---|---|---|---|---|
| Control no CMC | 2 | 2 | 1 | 1 | 2 |
| 0.4% CMC | 4.1 | 3 | 3 | 3 | 8 |
| 0.5% CMC | 4.4 | 4 | 5 | 5 | 12 |
| 0.6% CMC | 4.9 | 5 | 5 | 5 | 15 |
| 0.7% CMC | 5.0 | 5 | 5 | 5 | 20 |
| 0.8% CMC | 5.5 | 5 | 3 | 4 | 25 |
| 0.9% CMC | 5.0 | 4 | 2 | 3 | 31 |
| 1.0% CMC | 4.3 | 4 | 1 | 2 | 38 |
| 1.1% CMC | 4.3 | 4 | 1 | 1 | 42 |

Hydrocolloids such as guar can improve machinability, tortilla texture, puffings and rollability by increasing the masa dough liquor viscosity. Some ionic hydrocolloids such as CMC and carrageenan can further improve flexibility and tortilla strength by interacting with the native proteins. This effect can be seen in the tortilla liquor analysis.

Example 9

Combination Products

TS-B 746 is a combination of 1% Carrageenan with 75–200 ppm SMS (sodium metabisulphite—a reducing agent). GRINDAMYL™ PR 46 is a combination of protease, xylanase and glucanase activity. TS-B 746 and GRINDAMYL™ PR 46 are both available from Danisco Ingredients, Denmark.

The masa dough viscosity has been regulated by the use of hydrocolloids in order to achieve machinable masa dough. CMC has been chosen in most cases except if there is glucanase activity in the product. In these case guar has been chosen in spite of it lesser effect on strength and flexibility in comparison to CMC. The effect of gluten becomes more evident in combination with reducing agents. The same effect has been shown for CITREM LR 10. This could be explained by the increase of interactive sites.

| Product | Dosage on flour | Rollability day 6/day | Surface texture | Puffing | Dough liquor cP | Dough liquor O.D. 280 nm |
|---|---|---|---|---|---|---|
| TS-B 746 + 0.5% CMC | 1% | 5 | 5 | 4 | 8.0 | 0.53 |
| Control + CMC | 0.2% | 3.5 | 3 | 2 | 2.2 | 0.15 |
| Vital gluten + CMC | 0.5% + 0.2% | 4 | 3 | 3 | 2.4 | 0.16 |
| Vital gluten + CMC + L-cystein | 0.5% + 0.2% + 75 ppm | 4.5 | 4 | 4 | 2.3 | 0.22 |
| Control + CMC | 0.5% | 4 | 4 | 4 | 4.7 | 0.33 |
| Citrem LR 10 + L-cystein + CMC | 1% + 75 ppm + 0.5% | 4.5 | 4 | 4 | 6.2 | 0.56 |
| Citrem LR 10 + Vital gluten + L-cystein + CMC | 1% + 0.5% + 75 ppm + 0.2% | 4.5 | 4 | 3 | 2.3 | 0.31 |

| Enzyme TS-E no. | Dosage ppm on basis of flour | Hydrocolloid in % of on flour | cP of dough liquor | O.D. 280 nm (dilution 200 µl in 6 ml. Water) of dough liquor | Dough penetration force (g) | dough penetration area g mm | pH of dough |
|---|---|---|---|---|---|---|---|
| control | | 0.25% containing CMC pectin and guar | 2.3 | 0.146 | 0.500 | 4.6 | 5.47 |
| GRINDAMYL ™ PR 46 | 200 | 0.2% CMC | 1.7 | 0.161 | 0.460 | 4.2 | 5.47 |
| GRINDAMYL ™ PR 46 | 200 | 0.2% guar 1400 | 2.2 | 0.152 | 0.420 | 3.9 | 5.46 |

| Enzyme TS-E no. | Dosage ppm on basis of flour | Subjective characteristics | cP of extracted tortilla liquor | O.D. 280 nm (dilution 200 µl in 6 ml. water. Tortilla extract | Tortilla penetration force (g) day: 4-6-12 | Water % of tortilla |
|---|---|---|---|---|---|---|
| Control | | rough surface, few puffing | 3.4 | 0.475 | 0.30-0.32-0.33 | 42.4 |
| GRINDAMYL ™ PR 46 | 200 | rough, elastic, strong, large puffing | 2.3 | 0.347 | 0.24-0.33-0.34 | 44.1 |
| GRINDAMYL ™ PR46 | 200 | Smoother surface, strong, elastic good puffing | 3.3 | 0.564 | 0.25-0.30-0.35 | 46.3 |

GRINDAMYL ™ PR 46 improves flexibility and strength in combination with guar but not in the same extent in combination with CMC.

The O.D. value at 280 nm is higher in masa dough liquor in comparison to control but in the tortilla liquor the opposite is true. CMC in combination with GRINDAMYL™ PR 46 solubilises the proteins in masa dough but increased interaction to other corn flour components become detectable after baking, by O.D. measurements by spectophotometry. The viscosity in the masa dough and the tortilla liquor is reduced in comparison to control. This implies that the components size in the liquor is reduced or that the components giving viscosity have interacted with pellet components.

The enzyme combination GRINDAMYL™ PR 46 increases water holding capacity of the tortilla.

All publications mentioned in the above specification are herein incorporated by reference. Various modifications and variations of the described methods and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in chemistry or related fields are intended to be within the scope of the following claims.

What is claimed is:

1. A process for the preparation of a modified masa foodstuff, the process comprising the steps of:
   (i) preparing a masa by nixtamalisation of corn; and
   (ii) contacting a reducing agent or an enzyme with
      (a) the masa, and optionally
      (b) the corn prior to nixtamalisation
such that the conformation of a protein native to the corn is changed or such that a peptide or disulphite bond of a protein native to the corn is cleaved, wherein the enzyme is a protease, and wherein the reducing agent is capable of cleaving a disulphite bond oh protein native to the corn.

2. The process of claim 1, wherein the masa foodstuff is selected from the group consisting of corn tortilla, soft tortilla, corn chips, tortilla chips, taco shells, and tamales.

3. The process of claim 1, wherein the reducing agent is selected from the group consisting of L-cysteine, metabisulfite, inactivated yeast extract, glutathione, and derivatives and mixtures thereof.

4. The process of claim 1, wherein the masa foodstuff further comprises carrageenan.

5. The process of claim 1, wherein the masa foodstuff further comprises guar gum.

6. A mesa foodstuff obtained by the process of claim 1.

7. A method of using a reducing agent or an enzyme to provide a higher degree of interaction of a protein in a masa foodstuff with other proteins or other components in the masa foodstuff, when compared to an protein in an unmodified form, the method comprising the steps of:
   (i) preparing masa by nixtamalisation of corn
   (ii) contacting a reducing agent or an enzyme with
      (a) the masa, and optionally
      (b) the corn prior to nixtamalisation,
wherein the protein is native to the corn, wherein the enzyme is a protease, and wherein the reducing agent is capable of cleaving a disulphite bond of the protein.

8. The process of claim 1, wherein the reducing agent is selected from the group consisting of L-cysteine, metabisulfite, glutathione, derivatives and mixtures thereof.

9. The process of claim 1, wherein the masa is contacted with the reducing agent.

10. The process of claim 1, wherein the masa foodstuff further comprises a hydrocolloid.

11. The process of claim 1, wherein the masa is contacted with the protease and a xylanase.

* * * * *